US010551816B2

(12) United States Patent
Koyanaka

(10) Patent No.: US 10,551,816 B2
(45) Date of Patent: Feb. 4, 2020

(54) NUMERICAL CONTROLLER OSCILLATING MOTION ADJUSTMENT

(71) Applicant: FANUC CORPORATION, Minamitsuru-gun, Yamanashi (JP)

(72) Inventor: Yousuke Koyanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/353,155

(22) Filed: Nov. 16, 2016

(65) Prior Publication Data

US 2017/0139396 A1    May 18, 2017

(30) Foreign Application Priority Data

Nov. 17, 2015    (JP) .................................. 2015-225075

(51) Int. Cl.
G05B 19/402    (2006.01)
(52) U.S. Cl.
CPC .. G05B 19/402 (2013.01); *G05B 2219/41326* (2013.01); *G05B 2219/49384* (2013.01); *G05B 2219/50007* (2013.01)
(58) Field of Classification Search
CPC ............ G05B 2219/15005; G05B 2219/49384
USPC ........................................................ 700/117
See application file for complete search history.

(56) References Cited

U.S. PATENT DOCUMENTS 4,293,913 A * 10/1981 Nishimura ......... G05B 19/4093
451/5
4,539,634 A    9/1985 Sakai et al.
5,172,040 A    12/1992 Sasaki et al.
2005/0042052 A1    2/2005 Nakazato et al.
2005/0149224 A1    7/2005 Sakagami et al.
2005/0215176 A1    9/2005 Sakagami et al.
(Continued)

FOREIGN PATENT DOCUMENTS

CN    1584763 A    2/2005
CN    1623126 A    6/2005
CN    105549534 A    5/2016
(Continued)

OTHER PUBLICATIONS

Notification of Reasons for Refusal for Japanese Application No. 2015-225075, dated Nov. 28, 2017, including English translation, 8 pages.
(Continued)

*Primary Examiner* — Emilio J Saavedra
(74) *Attorney, Agent, or Firm* — RatnerPrestia

(57) ABSTRACT

A numerical controller of the present invention is provided with an oscillating motion data holding unit configured to hold oscillating motion data used for the control of an oscillating motion, an oscillating pulse calculation unit configured to calculate oscillating pulses used for the control of an oscillation axis, based on the oscillating motion data held in the oscillating motion data holding unit, and output the calculated oscillating pulses, a motor control unit configured to control a motor for driving the oscillation axis, based on the oscillating pulses, and an oscillating motion data calculation unit configured to determine a data item related to the oscillating motion to be adjusted, based on the state of a switch means on a control panel of a machine, and to adjust the value of the data item related to the oscillating motion, based on manual pulses input from a manual pulse generator.

10 Claims, 6 Drawing Sheets

(56) References Cited

U.S. PATENT DOCUMENTS

2011/0287693 A1    11/2011   Hosokawa et al.
2016/0116896 A1    4/2016    Oonishi

FOREIGN PATENT DOCUMENTS

| EP | 0431177 A1 * | 6/1991 | ....... G05B 19/40937 |
|----|----|----|----|
| JP | 63211402 A | 9/1988 | |
| JP | S 6-3314603 A | 12/1988 | |
| JP | 0230468 A | 1/1990 | |
| JP | 3-31906 A | 2/1991 | |
| JP | 4-59105 A | 9/1992 | |
| JP | H 05-282047 A | 10/1993 | |
| JP | H06119018 A | 4/1994 | |
| JP | 2010238045 A * | 10/2010 | |
| JP | 2010238045 A | 10/2010 | |
| JP | 4809488 | 8/2011 | |
| WO | 2004102290 A1 | 11/2004 | |

OTHER PUBLICATIONS

Decision to Grant a Patent for Japanese Application No. 2015-225075, dated Apr. 10, 2018 with translation, 6 pages.
Chinese Office Action for Chinese Application No. 2016110256085, dated Nov. 22, 2018 with translation, 12 pages.

* cited by examiner

ONLY UPPER
SWITCH ON

ONLY LOWER
SWITCH ON

BOTH UPPER AND
LOWER SWITCHES
ON

BOTH UPPER AND
LOWER SWITCHES
OFF

| OSCILLATING MOTION DATA SCREEN | | | |
|---|---|---|---|
| UPPER BOUNDARY-POINT POSITION | COMMAND VALUE <1> | ADJUSTMENT AMOUNT (HANDLE) <2> | HOLD <3> |
| LOWER BOUNDARY-POINT POSITION | COMMAND VALUE <1> | <2> | <3> |
| OSCILLATING SPEED | COMMAND VALUE <4> | CURRENT SPEED <5> | CONSTANT-PERIOD <6> |

NUMERICAL CONTROLLER OSCILLATING MOTION ADJUSTMENT

BACKGROUND OF THE INVENTION

Field of the Invention

The present invention relates to a numerical controller, and more particularly, to a numerical controller with a manual oscillation width adjustment function.

Description of the Related Art

Grinders are often manually operated through interruption in order to finely adjust machining conditions even during automatic operation, especially in single-item machining. In particular, an operator can perform the fine adjustment while checking an actual operation state, by using a manual pulse generator as an adjusting means, and moreover, finely adjust the machining conditions in minimum command units by gradually operating the manual pulse generator (Japanese, Patent Application Laid-Open No. 03-031906).

FIG. 8 is a diagram showing an example in which a tool for polishing machining is vertically oscillated to polish a workpiece. In the polishing machining shown in FIG. 8, the oscillation width may sometimes be expected to be adjusted during an oscillating motion of the tool while watching the tool oscillating based on a commanded oscillation width. In such a case, the operator must command the oscillation width again. In order to command a determined adjustment amount again, set values must be changed by operating a keyboard or the like attached to a numerical controller if the oscillation width can be set by parameters, for example.

Since specific numerical values must be input in changing the set values as described above, however, change amounts cannot be instinctively determined and set, so that the operator may be forced to frequently repeat the change of setting and motion check if he/she is not very experienced.

Moreover, since the numerical controller must be operated at a distance from a machine tool during the adjustment, the actual oscillating motion cannot be checked during the adjustment. Accordingly, the values must be gradually changed so that the machining area cannot be exceeded, and therefore, there is a problem that the operator requires much time and labor. In this regard, even if the handle interruption function disclosed in Japanese Patent Application Laid-Open No. 03-031906) is used, adjustment for changing other parameters, e.g., the oscillation width, cannot be performed, although adjustment for shifting the center of oscillation while checking the oscillating motion can be achieved, as shown in FIG. 9.

Japanese Patent Application Laid-Open No. 63-314603, Japanese Examined Patent Publication No. 04-059105 and the like disclose techniques in which the result of changes of paths and speeds by manual handle interruption or override switches is reflected on and stored in a machining program itself. In any of these techniques, the objective paths and speeds are commanded by the machining program so that it is impossible to adjust and store data such as the boundary-point positions and oscillation width of an oscillating motion that can be set and commanded without regard to the machining program.

Japanese Patent Application Laid-Open No. 05-282047 discloses a technique capable of easily rounding fractions, if any, produced in a coordinate system for alignment by a manual feed operation. This technique, however, cannot adjust data such as the boundary-point positions and oscillation width of an oscillating motion.

SUMMARY OF THE INVENTION

Accordingly, the object of the present invention is to provide a numerical controller configured so that adjustment of various parameters (oscillation data such as boundary-point positions and oscillation width) for an oscillating motion and storage of adjustment amounts can be achieved by an operation through a control panel.

A numerical controller according to the present invention, which controls an oscillating motion of an oscillation axis of a machine, comprises an oscillating motion data holding unit configured to hold oscillating motion data used for the control of the oscillating motion, an oscillating pulse calculation unit configured to calculate oscillating pulses used for the control of the oscillation axis, based on the oscillating motion data held in the oscillating motion data holding unit, and output the calculated oscillating pulses, a motor control unit configured to control a motor for driving the oscillation axis, based on the oscillating pulses output from the oscillating pulse calculation unit, and an oscillating motion data calculation unit configured to determine a data item related to the oscillating motion to be adjusted, out of the oscillating motion data held in the oscillating motion data holding unit, based on the state of a switch means on a control panel of the machine, and to adjust the value of the data item related to the oscillating motion to be adjusted, based on manual pulses input from a manual pulse generator on the control panel of the machine.

In the numerical controller described above, the data item includes an upper boundary-point position, a lower boundary-point position, an oscillation width, and/or an oscillation center position, and the oscillating motion data holding unit also stores an adjustment amount for the data item related to the oscillating motion.

In the numerical controller, the switch means includes at least two switches, and the oscillating pulse calculation unit determines the data item related to the oscillating motion to be adjusted, based on a combination of the respective on-off states of the switches.

In the numerical controller, the oscillating pulse calculation unit adjusts the speed of the oscillating motion so that the period of the oscillating motion does not change after the value of the data item related to the oscillating motion is adjusted.

In the numerical controller, the value of the data item related to the oscillating motion included in oscillating motion data held in the oscillating motion data holding unit is displayed.

According to the present invention, an operator can instinctively adjust an oscillation width by an operation through a control panel while watching an actual oscillating motion, so that labor for the adjustment of parameters (oscillation data such as boundary-point positions and oscillation width) for the oscillating motion can be reduced.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An embodiment of the present invention will now be described with reference to the accompanying drawings.

Figure 1:
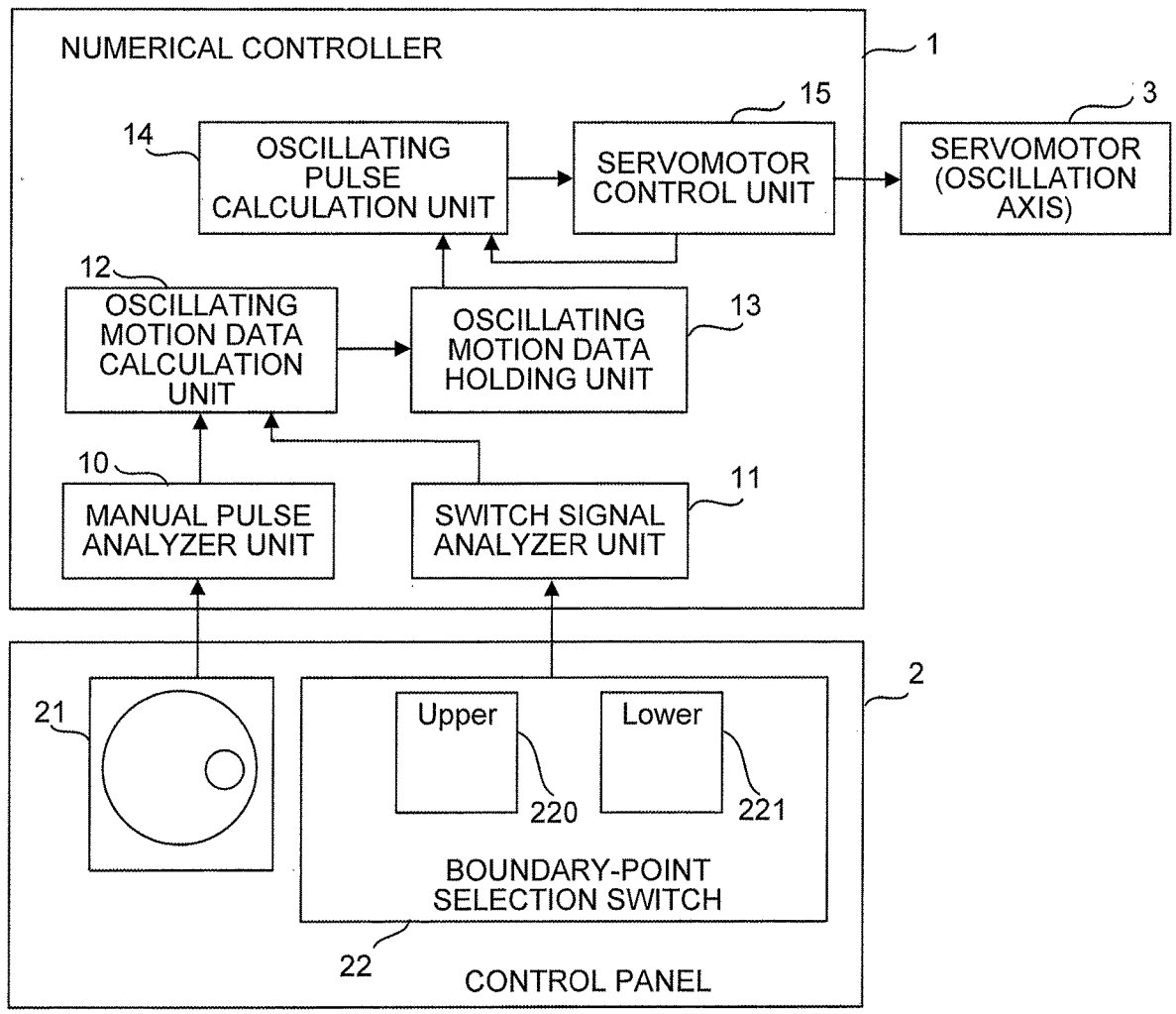
FIG. 1 is a block diagram showing a configuration of a numerical controller according to one embodiment of the present invention.

FIG. 1 is a block diagram of a numerical controller according to one embodiment of the present invention. A numerical controller 1 of the present embodiment comprises a manual pulse analyzer unit 10, switch signal analyzer unit 11, oscillating motion data calculation unit 12, oscillating motion data holding unit 13, oscillating pulse calculation unit 14, and servomotor control unit 15.

The manual pulse analyzer unit 10 analyzes a pulse signal output from a manual pulse generator 21 on a control panel 2 attached to a machine tool (not shown), and generates data indicative of operating directions (positive and negative) and a manipulated variable and outputs them to the oscillating motion data calculation unit 12. The manual pulse generator 21 is formed of, for example, a handle or the like that can be manually operated by an operator. When it is rotated positively or negatively, the pulse signal is output in response to this rotation.

The switch signal analyzer unit 11 analyzes signals (on-off) from various switches on the control panel 2 attached to the machine tool (not shown). If the switch signal analyzer unit 11 detects the on-off state of a boundary-point selection switch 22 (comprising upper and lower switches 220 and 221), it outputs data indicative of the on-off state to the oscillating motion data calculation unit 12.

Figure 2:
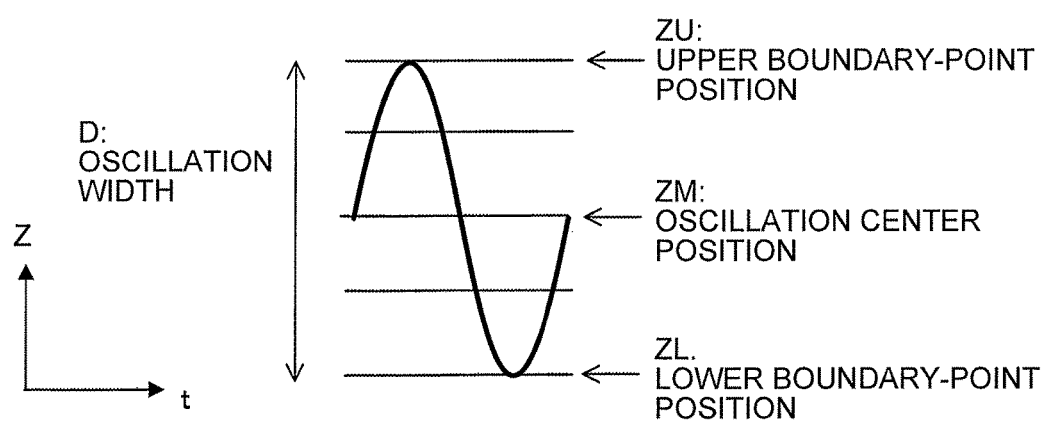
FIG. 2 is a diagram showing an example of a data item for an oscillating motion.

The oscillating motion data calculation unit 12 is a function means for calculating oscillating motion data used for the control of the oscillating motion based on parameter setting and commanding by an operator and outputting the data to the oscillating motion data holding unit 13. FIG. 2 is a diagram showing the relationship between an example of an oscillating motion of the tool and the oscillating motion data held in the oscillating motion data holding unit 13. The oscillating motion, which is defined as a reciprocating motion relative to the direction of one axis shown in FIG. 2 (Z-axis in FIG. 2), can be defined by at least three data items; an upper boundary-point position ZU, lower boundary-point position ZL, and command speed F. The oscillating motion data holding unit 13 holds these data items. Moreover, the oscillating motion data holding unit 13 may be configured to hold secondary data items, such as an oscillation width D and an oscillation center position ZM, based on the values of the data items. Furthermore, the amount of adjustment by the operator's operation for each value commanded by a command code for the oscillating motion may be stored. If the upper boundary-point position (commanded upper boundary-point position) commanded by the oscillating motion command code and the amount of adjustment (stored value of upper adjustment) of the upper boundary-point position by the operator's operation are ZCU and AU, respectively, ZCU and AU may be separately held instead of simply holding ZU (=ZCU+AU). In this way, the operator can also confirm the adjusted amount on screen or use the held adjustment amount to adjust the machine tool or the like afterward.

The oscillating motion data calculation unit 12 adjusts the oscillating motion data currently held in the oscillating motion data holding unit 13, based on the data indicative of the operating directions and the manipulated variable of the manual pulse generator 21 received from the manual pulse analyzer unit 10 and the data indicative of the on-off state of the boundary-point selection switch 22 received from the switch signal analyzer unit 11. The adjustment of the oscillating motion data by the oscillating motion data calculation unit 12 will be described in detail later.

The oscillating pulse calculation unit 14 calculates oscillating pulses used for the control of a servomotor 3, based on position information (on the position and rotation direction) of the servomotor 3 fed back from the servomotor control unit 15 and the oscillating motion data held in the oscillating motion data holding unit 13, and outputs the calculated oscillating pulses to the servomotor control unit 15.

Then, the servomotor control unit 15 controls the operation of the servomotor 3 based on the oscillating pulses received from the oscillating pulse calculation unit 14.

The following is a description of the adjustment of the oscillating motion data by the oscillating motion data calculation unit 12.

Figure 3:
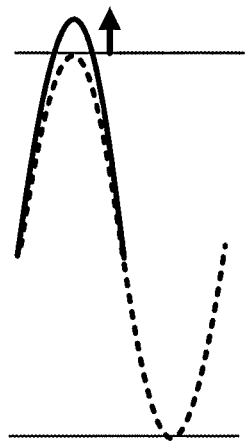
FIG. 3 is a diagram showing an example of adjustment of the oscillating motion according to the present invention.
Figure 3:
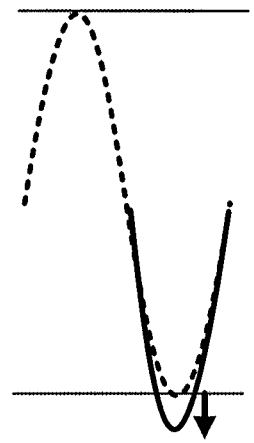
Figure 3:
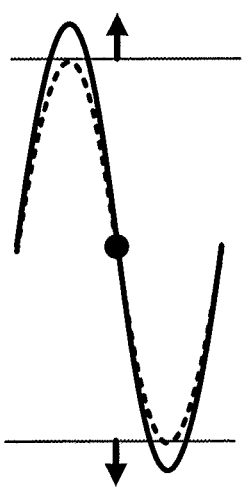
Figure 3:
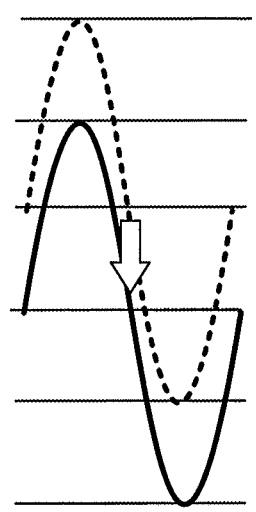

FIG. 3 is a diagram illustrating the contents of the adjustment of the oscillating motion for each on-off state of the boundary-point selection switch 22. The oscillating motion data calculation unit 12 of the present embodiment changes the data items of the oscillating motion data to be adjusted when the manual pulse generator 21 is operated, in accordance with a combination of the respective on-off states of the upper and lower switches 220 and 221.

[Combination 1] Upper switch on and lower switch off:

The upper boundary-point position ZU is adjusted by operating the manual pulse generator 21.

[Combination 2] Upper switch off and lower switch on:

The lower boundary-point position ZL is adjusted by operating the manual pulse generator 21.

[Combination 3] Both upper and lower switches on:

The oscillation width D is adjusted by operating the manual pulse generator 21.

[Combination 4] Both upper and lower switches off:

The oscillation center position ZM is adjusted by operating the manual pulse generator 21.

Figure 4:
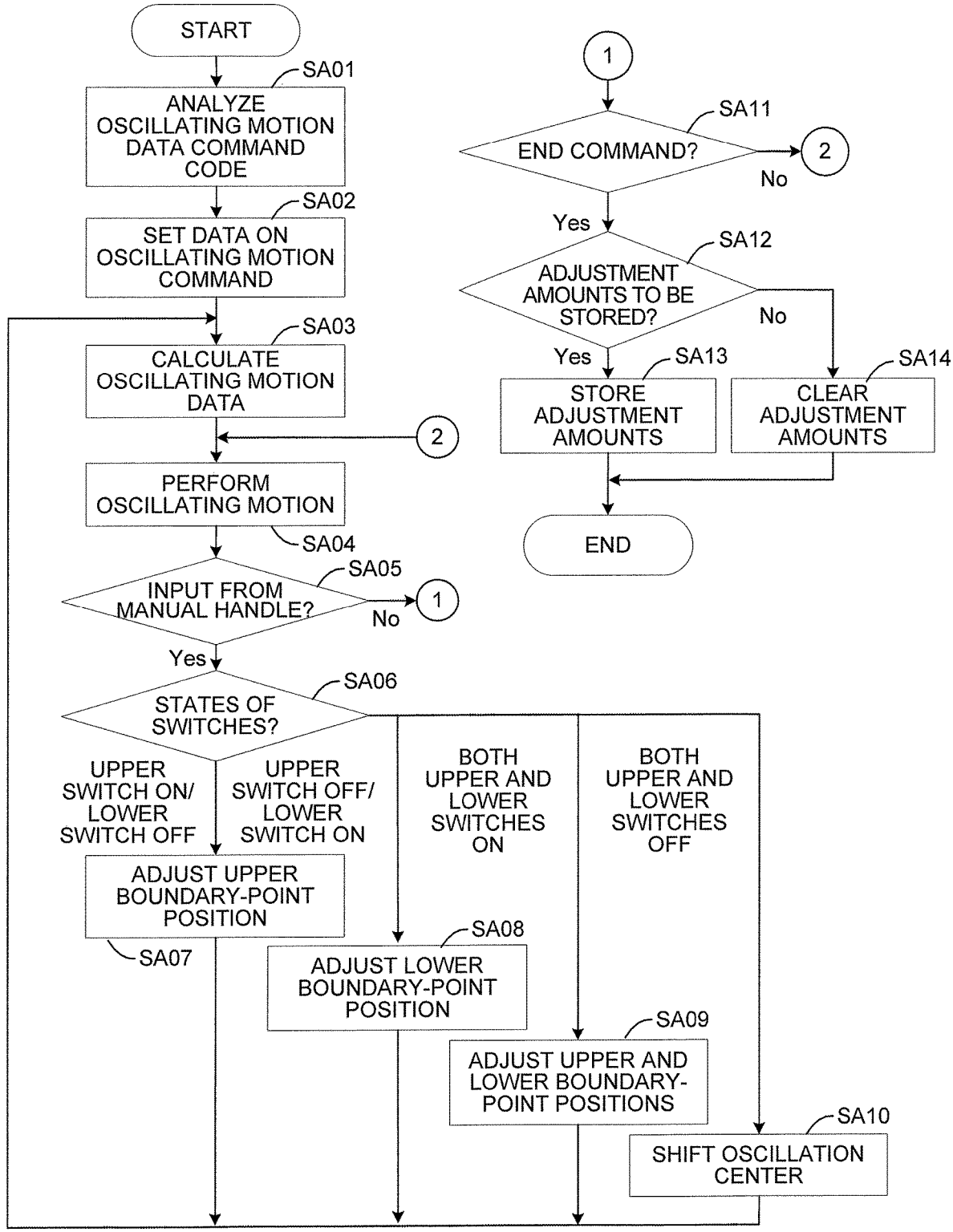
FIG. 4 is a flowchart showing processing for oscillating motion adjustment performed on the numerical controller according to the one embodiment of the present invention.

FIG. 4 is a flowchart showing processing performed on the numerical controller 1.

[Step SA01] When the start of the oscillating motion is commanded, the oscillating motion data calculation unit 12 analyzes the oscillating motion command code.

[Step SA02] Based on the result of the analysis in Step SA01, the oscillating motion data calculation unit 12 sets the values of the data items used for the control of the oscillating motion into the oscillating motion data holding unit 13. For example, the commanded upper boundary-point position ZCU (mm), a commanded lower boundary-point position ZCL (mm), and a command speed FC (mm/min) are set based on the oscillating motion command code. Moreover, an upper adjustment value AU (mm) and a lower adjustment value AL (mm) as data items indicative of adjustment amounts are set as initial set values (upper and lower adjustment stored values stored in a setting area on a memory; zero if not set).

[Step SA03] The oscillating motion data calculation unit 12 calculates the oscillating motion data used for the control of the oscillating motion, based on the values of the data items set in Step SA02, and sets them into the oscillating motion data holding unit 13. For example, the upper boundary-point position ZU (mm) is set to ZCU+AU; the lower boundary-point position ZL (mm) to ZCL+AL, the oscillation width D (mm) to |ZU−ZL|, and an amount of movement f (mm/msec) per unit time (1 msec) to FC (mm/min)×1/60,000 (min/msec).

[Step SA04] The oscillating motion control is performed as the oscillating pulse calculation unit 14 outputs pulses for the oscillating motion control to the servomotor control unit 15, based on the position information (on the position and rotation direction) of the servomotor 3 fed back from the servomotor control unit 15 and the values of the data items of the oscillating motion data set in Step SA03.

[Step SA05] The oscillating motion data calculation unit 12 determines whether or not there is any input from the manual pulse generator 21. If there is an input from the manual pulse generator 21, the processing proceeds to Step SA06. If not, the processing proceeds to Step SA11.

[Step SA06] The oscillating motion data calculation unit 12 determines the combination of the respective on-off states of the upper and lower switches 220 and 221. If the upper and lower switches 220 and 221 are on and off, respectively, the processing proceeds to Step SA07. If the upper and lower switches 220 and 221 are off and on, respectively, the processing proceeds to Step SA08. If both the upper and lower switches 220 and 221 are on, the processing proceeds to Step SA09. If both the upper and lower switches 220 and 221 are off, the processing proceeds to Step SA10.

[Step SA07] The oscillating motion data calculation unit 12 adjusts the upper boundary-point position by adjusting AU by a pulse amount input from the manual pulse generator 21 (by addition if the operating direction of the manual pulse generator 21 is positive or by subtraction if the operating direction is negative). After the adjustment, the processing returns to Step SA03.

[Step SA08] The oscillating motion data calculation unit 12 adjusts the lower boundary-point position by adjusting AL by a pulse amount input from the manual pulse generator 21 (by subtraction if the operating direction of the manual pulse generator 21 is positive or by addition if the operating direction is negative). After the adjustment, the processing returns to Step SA03.

[Step SA09] The oscillating motion data calculation unit 12 adjusts the upper and lower boundary-point positions (oscillation width D) by adjusting AU by the pulse amount input from the manual pulse generator 21 (by addition if the operating direction of the manual pulse generator 21 is positive or by subtraction if the operating direction is negative) and also adjusting AL by the pulse amount input from the manual pulse generator 21 (by subtraction if the operating direction of the manual pulse generator 21 is positive or by addition if the operating direction is negative). After the adjustment, the processing returns to Step SA03.

[Step SA10] The oscillating motion data calculation unit 12 adjusts the oscillation center position by adjusting AU by the pulse amount input from the manual pulse generator 21 (by addition if the operating direction of the manual pulse generator 21 is positive or by subtraction if the operating direction is negative) and also adjusting AL by the pulse amount input from the manual pulse generator 21 (by addition if the operating direction of the manual pulse generator 21 is positive or by subtraction if the operating direction is negative). After the adjustment, the processing returns to Step SA03.

[Step SA11] The oscillating motion data calculation unit 12 determines whether or not an end command is issued from the operator. If the end command is issued, the processing proceeds to Step SA12. If not, the processing returns to Step SA04.

[Step SA12] The oscillating motion data calculation unit 12 determines whether or not the storage of the adjustment amounts is commanded by the operator. If the storage of the adjustment amounts is commanded, the processing proceeds to Step SA13. If not, the processing proceeds to Step SA14.

[Step SA13] The oscillating motion data calculation unit 12 stores the upper adjustment value AU adjusted by the operator as the upper adjustment stored value in the setting area on the memory and also stores the lower adjustment value AL as the lower adjustment stored value in the setting area on the memory, whereupon the oscillating motion control processing ends.

[Step SA14] The oscillating motion data calculation unit 12 clears the upper and lower adjustment stored values in the setting area on the memory to zero, whereupon the oscillating motion control processing ends.

If the oscillation width D is changed by adjusting the upper and lower boundary-point positions ZU and ZL as the processing shown in the flowchart of FIG. 4 is performed, the period of the oscillating motion inevitably changes when the servomotor is operated at an unchanged speed. A period T (time for each reciprocation) can be calculated based on the oscillation width D (mm) and the command speed FC (mm/min), by equation (1) as follows:

$$\text{Period } T = (2 \times \text{oscillation width } D)/\text{command speed } FC. \tag{1}$$

If the period T must be maintained during the adjustment of the oscillation width, therefore, the speed is adjusted so that the servomotor 3 operates at a corrected speed FC' calculated according to the following equation (2). In equation (2), α (mm) designates an oscillation width adjustment amount. The oscillation width adjustment amount α is an increment of the oscillation width D shown in FIG. 5 if the oscillation width is increased by adjusting the lower boundary-point position ZL in the negative Z-axis direction, for example.

$$\text{Corrected speed } FC' = (1 + \text{adjustment amount } \alpha/2D) \times FC. \tag{2}$$

Moreover, if such a technique as disclosed in Japanese Patent No. 4809488, in which the oscillating motion is controlled by angle information, is applied, the command speed FC is the maximum speed during the oscillating motion, and the period T is calculated by equation (3) as follows:

$$\text{Period } T = (2\pi \times \text{oscillation width } D)/\text{command(maximum) speed } FC. \tag{3}$$

Furthermore, the corrected speed FC' for maintaining the period is calculated by equation (4) as follows:

$$\text{Corrected speed } FC' = (1 + \text{adjustment amount } \alpha/2\pi D) \times FC. \tag{4}$$

In order to maintain the period T, in the present embodiment, it is necessary only that the calculation of the corrected speed be performed in the oscillating motion data calculation unit 12 so that the calculated corrected speed can be held in the oscillating motion data holding unit 13 after Steps SA07 to SA10 shown in the flowchart of FIG. 4 are performed.

Figures 5, 6:
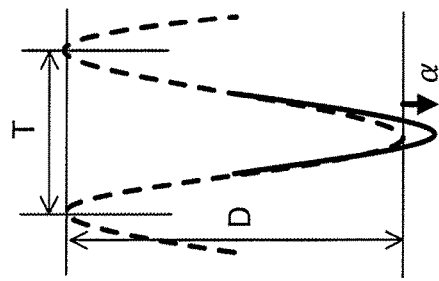
FIG. 5 is a diagram illustrating a period T based on the oscillating motion adjustment.
FIG. 6 is a diagram showing an example of an oscillating motion data screen.

FIG. 6 is a screen display example on the numerical controller given when the oscillating motion data is adjusted during the oscillating motion. The following values are individually displayed in frames shown in FIG. 6.

<1>: Commanded amount of upper boundary-point position ZCU and commanded amount of lower boundary-point position ZCL (mm)

<2>: Adjustment amount of upper boundary-point position AU and adjustment amount of lower boundary-point position AL (mm)

<3>: Checkboxes indicative of whether to hold adjustment amounts of upper and lower boundary-point positions (adjustment amounts are held during check)

<4>: Command value of oscillating speed FC (mm/min)

<5>: Current oscillating speed F (mm/min)

<6>: Checkbox indicative of whether to keep period T constant during oscillation width adjustment (period T is kept constant during check)

Figure 7:
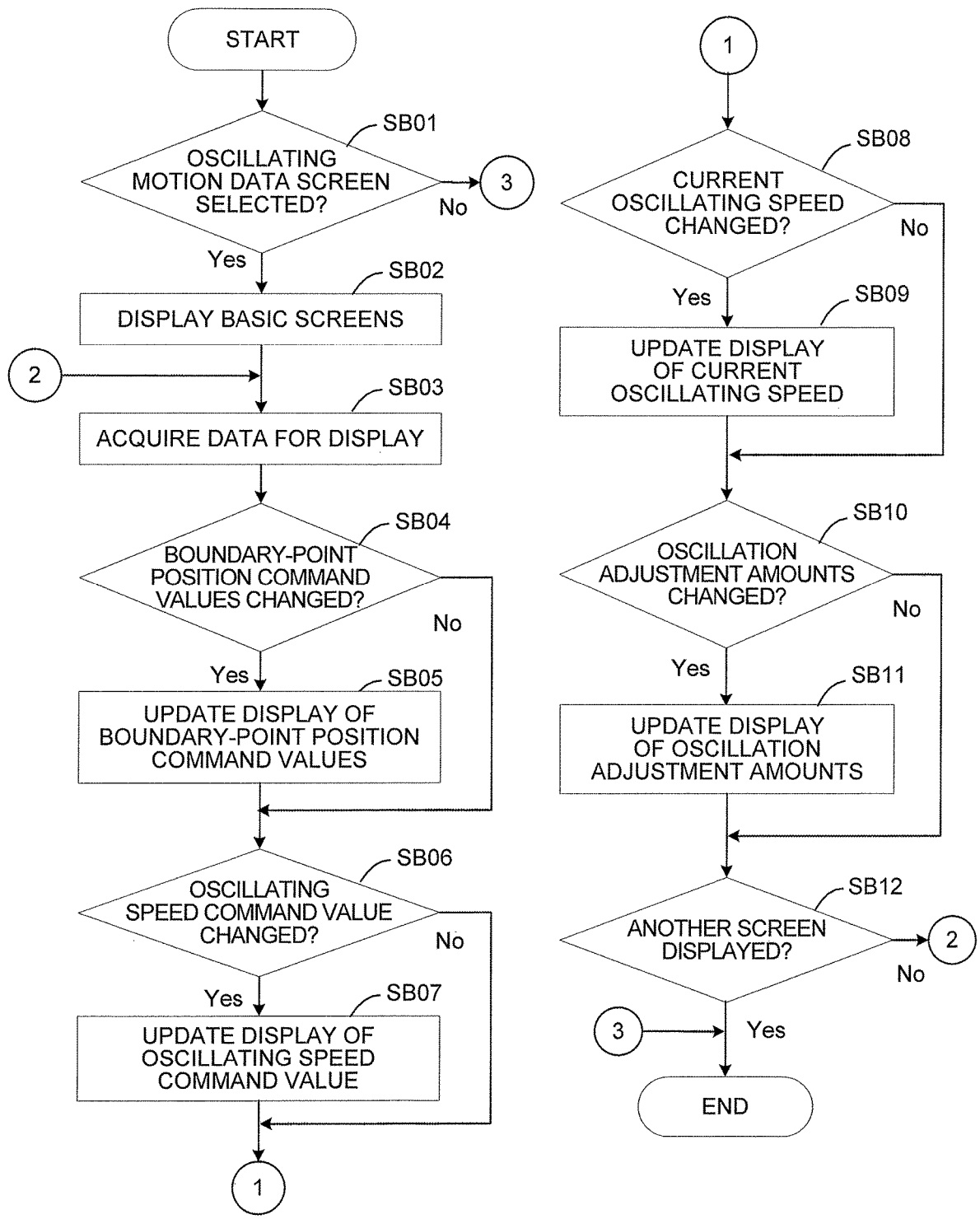
FIG. 7 is a flowchart showing processing for the display of the oscillating motion data screen.
Figure 8:
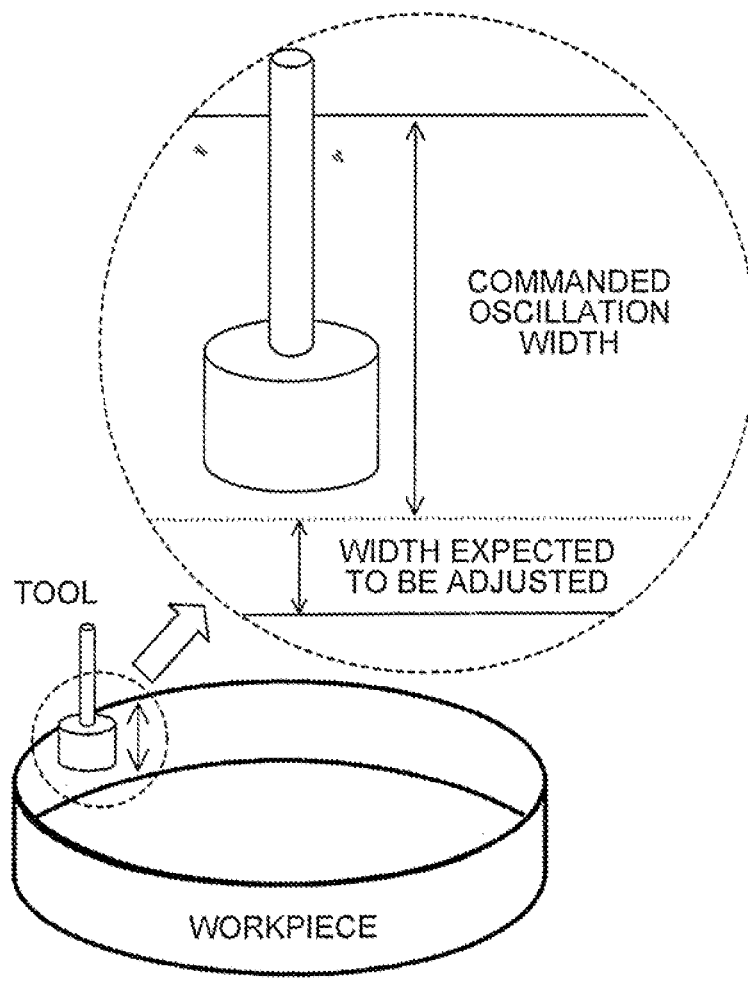
FIG. 8 is a diagram showing an example in which a tool is oscillated to machine a workpiece.
Figure 9:
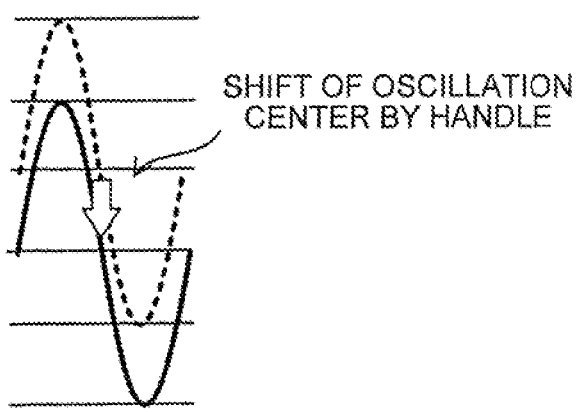
FIG. 9 is a diagram illustrating prior art oscillating motion adjustment.

FIG. 7 is a flowchart showing processing for displaying the screen shown in FIG. 6.

[Step SB01] It is determined whether or not the display of the oscillating motion data screen is selected.

If the display is selected, the processing proceeds to Step SB02. If not, this processing ends.

[Step SB02] Basic screens (text fields or the like displaying unchangeable character strings and various data) as a base of display are displayed.

[Step SB03] Display data to be displayed in the text fields (<1> to <6> in FIG. 6) of Step SB02 are acquired. The display data include the boundary-point position command values ZCU and ZCL, oscillating speed command value FC, current oscillating speed F, oscillation adjustment amounts AU and AL, and the like.

[Step SB04] It is determined whether or not the upper and lower boundary-point position command values ZCU and ZCL are changed from previously displayed values. If the values are changed, the processing proceeds to Step SB05. If not, the processing proceeds to Step SB06.

[Step SB05] The display of the upper and lower boundary-point position command values ZCU and ZCL is updated.

[Step SB06] It is determined whether or not the oscillating speed command value FC is changed from a previously displayed value. If the value is changed, the processing proceeds to Step SB07. If not, the processing proceeds to Step SB08.

[Step SB07] The display of the oscillating speed command value FC is updated.

[Step SB08] It is determined whether or not the current oscillating speed F is changed from a previously displayed value. If the speed is changed, the processing proceeds to Step SB09. If not, the processing proceeds to Step SB10.

[Step SB09] The display of the current oscillating speed F is updated.

[Step SB10] It is determined whether or not the upper and lower oscillation adjustment amounts AU and AL are changed from previously displayed values. If the amounts are changed, the processing proceeds to Step SB11. If not, the processing proceeds to Step SB12.

[Step SB11] The display of the upper and lower oscillation adjustment amounts AU and AL is updated.

[Step SB12] It is determined whether or not an operation for display change to another screen is performed by the operator. If the operation for display change to another screen is performed, this processing ends. If not, the processing returns to Step SB03.

While an embodiment of the present invention has been described herein, the invention is not limited to the above-described embodiment and may be suitably modified and embodied in various forms.

The invention claimed is:

1. A numerical controller which controls an oscillating motion of an oscillation axis of a machine, the numerical controller comprising:
    an oscillating motion data holding unit configured to hold oscillating motion data used for the control of the oscillating motion;
    an oscillating pulse calculation unit configured to calculate oscillating pulses used for the control of the oscillation axis, based on the oscillating motion data held in the oscillating motion data holding unit, and output the calculated oscillating pulses;
    a motor control unit configured to control a motor for driving the oscillation axis, based on the oscillating pulses output from the oscillating pulse calculation unit; and
    an oscillating motion data calculation unit configured to:
        determine an oscillating motion adjustment based on a data item related to the oscillating motion, the data item selected based on a state of a switch means on a control panel of the machine,
        wherein in a first state the data item is selected to be an upper boundary-point position of the machine, in a second state the data item is selected to be a lower boundary-point position of the machine, in a third state the data item is selected to be an oscillation width of the machine, and in a fourth state the data item is selected to be an oscillation center position of the machine, and
        change a value of the selected data item to adjust the oscillating motion, based on manual pulses input from a manual pulse generator on the control panel of the machine,
        wherein in the first state the upper-boundary point position of the machine is adjusted based on manual pulses, in the second state the lower boundary-point position of the machine is adjusted based on manual pulses, in a third state the oscillation width of the machine is adjusted based on manual pulses, and in a fourth state the oscillation center position of the machine is adjusted based on manual pulses.

2. The numerical controller according to claim 1, wherein the oscillating motion data holding unit also stores an adjustment amount for the data item related to the oscillating motion.

3. The numerical controller according to claim 1, wherein the switch means includes at least two switches, and the oscillating pulse calculation unit determines the data item related to the oscillating motion to be adjusted, based on a combination of the respective on-off states of the switches.

4. The numerical controller according to claim 1, wherein the oscillating pulse calculation unit adjusts the speed of the oscillating motion so that the period of the oscillating motion does not change after the value of the data item related to the oscillating motion is adjusted.

5. The numerical controller according to claim 1, wherein the value of the data item related to the oscillating motion included in oscillating motion data held in the oscillating motion data holding unit is displayed.

6. A numerical controller which controls an oscillating motion of an oscillation axis of a machine, the numerical controller comprising:

an oscillating motion data holding unit configured to hold oscillating motion data used for the control of the oscillating motion;

an oscillating pulse calculation unit configured to calculate oscillating pulses used for the control of the oscillation axis, based on the oscillating motion data held in the oscillating motion data holding unit, and output the calculated oscillating pulses;

a motor control unit configured to control a motor for driving the oscillation axis, based on the oscillating pulses output from the oscillating pulse calculation unit; and an oscillating motion data calculation unit configured to:
determine an oscillating motion adjustment based on a data item related to the oscillating motion, the data item selected based on a state of a switch means on a control panel of the machine, wherein in a first state the data item is selected to be an upper boundary-point position of the machine, in a second state the data item is selected to be a lower boundary-point position of the machine, and in a third state the data item is selected to be both the upper boundary-point position and the lower boundary-point position, and change a value of the selected data item to adjust the oscillating motion, based on manual pulses input from a manual pulse generator on the control panel of the machine, wherein in the first state the upper-boundary point position of the machine is adjusted based on manual pulses while the lower-boundary point position is maintained, in the second state the lower boundary-point position of the machine is adjusted based on manual pulses while the upper-boundary point position is maintained, and in a third state both the upper boundary-point position and the lower boundary-point position are adjusted based on manual pulses.

7. The numerical controller according to claim 6, wherein the data item also includes an oscillation width, and/or an oscillation center position, and the oscillating motion data holding unit also stores an adjustment amount for the data item related to the oscillating motion.

8. The numerical controller according to claim 6, wherein the switch means includes at least two switches, and the oscillating pulse calculation unit determines the data item related to the oscillating motion to be adjusted, based on a combination of the respective on-off states of the switches.

9. The numerical controller according to claim 6, wherein the oscillating pulse calculation unit adjusts the speed of the oscillating motion so that the period of the oscillating motion does not change after the value of the data item related to the oscillating motion is adjusted.

10. The numerical controller according to claim 6, wherein the value of the data item related to the oscillating motion included in oscillating motion data held in the oscillating motion data holding unit is displayed.

* * * * *